(12) United States Patent
Singh et al.

(10) Patent No.: US 12,368,773 B2
(45) Date of Patent: *Jul. 22, 2025

(54) CROSS DEVICE APPLICATION DISCOVERY AND CONTROL

(71) Applicant: Microsoft Technology Licensing, LLC, Redmond, WA (US)

(72) Inventors: Arunjeet Singh, Redmond, WA (US); John M Sheehan, Somerville, MA (US); Kunal Gandhi, Redmond, WA (US); Sean McKenna, Seattle, WA (US); Akhilesh (Akhil) Kaza, Sammamish, WA (US); Sameer Tejani, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,420

(22) Filed: Oct. 2, 2023

(65) Prior Publication Data

US 2024/0031426 A1 Jan. 25, 2024

Related U.S. Application Data

(63) Continuation of application No. 17/575,157, filed on Jan. 13, 2022, which is a continuation of application
(Continued)

(51) Int. Cl.
*H04L 67/10* (2022.01)
*G06F 9/50* (2006.01)
*H04L 67/51* (2022.01)

(52) U.S. Cl.
CPC ............ *H04L 67/10* (2013.01); *G06F 9/5044* (2013.01); *G06F 9/5055* (2013.01); *H04L 67/51* (2022.05)

(58) Field of Classification Search
CPC ... H04L 63/0428; H04L 63/20; H04L 63/145; H04L 63/1425; H04L 67/12;
(Continued)

(56) References Cited

U.S. PATENT DOCUMENTS

| | | | | |
|---|---|---|---|---|
| 2005/0160289 | A1* | 7/2005 | Shay | H04L 63/0236 726/5 |
| 2006/0168213 | A1* | 7/2006 | Richardson | G06F 21/606 709/225 |
| 2010/0323681 | A1* | 12/2010 | Corda | H04W 4/50 705/26.1 |

OTHER PUBLICATIONS

Communication under Rule 71(3) EPC Received for European Application No. 15772089.7, mailed on May 14, 2018, 05 pages.
(Continued)

*Primary Examiner* — Djenane M Bayard

(57) ABSTRACT

Systems and methods cross device application discovery and/or control. Cross device application discovery and/or control can provide for simple detection and activation of applications on remote devices. Cross device application discovery and/or control can provide for the control of remote applications in a master and slave configuration. Responsive to an activation message, an application can execute a task in an application, the task being displayed on a target device. Responsive to an activation message, an application can execute a task in an application on a target device, a task context data for the task being streamed to the source device for presentation on a display. Cross device application discovery and/or control can be enabled on a single operating system, or across a plurality of operating systems.

20 Claims, 7 Drawing Sheets

Related U.S. Application Data

No. 16/940,155, filed on Jul. 27, 2020, now Pat. No. 11,228,640, which is a continuation of application No. 15/630,374, filed on Jun. 22, 2017, now Pat. No. 10,728,314, which is a continuation of application No. 14/508,801, filed on Oct. 7, 2014, now Pat. No. 10,171,558.

(60) Provisional application No. 62/049,979, filed on Sep. 12, 2014.

(58) Field of Classification Search
CPC ..... H04L 63/1433; H04L 63/10; H04L 63/08; H04L 63/0823; H04L 63/166; H04L 63/1441; H04L 9/14; H04L 67/10; H04L 63/1416; H04L 9/3263; H04L 63/0442; H04L 9/3247; H04L 63/0227; H04L 63/061; H04L 63/126; H04L 67/34; H04L 9/0891; H04L 9/3239; H04L 63/0807; H04L 9/50; H04L 63/101; H04L 63/0236; H04L 63/062; H04L 63/0853; H04L 63/0435; H04L 63/1408; H04L 9/0825; H04L 63/0876; H04L 9/3268; H04L 2209/80; H04L 9/321; H04L 63/083; H04L 9/30; H04L 12/66; H04L 41/0893; H04L 47/20; H04L 2012/40215; H04L 2012/40273; H04L 41/082; H04L 41/0843; H04L 41/0894; H04L 41/28; H04L 43/0876; H04L 61/3025; H04L 61/4511; H04L 67/02; H04L 67/51; H04L 67/1095; H04L 63/06; H04L 67/125; H04L 9/0877; H04L 63/123; H04L 67/141; H04L 69/14; H04L 9/3271; H04L 67/01; H04L 9/0841; H04L 12/2812; H04L 9/0861; H04L 12/2803; H04L 2012/2849; H04L 47/2475; H04L 63/02; H04L 65/1101; H04L 67/56

See application file for complete search history.

(56) References Cited

OTHER PUBLICATIONS

Decision to grant a European patent pursuant to Article 97(1) Received for European Application No. 15772089.7, mailed on Sep. 27, 2018, 02 pages.

Rejection Decision Received for Chinese Application No. 201580049159.5, mailed on Oct. 27, 2020, 10 pages.

Second Office Action Received for Chinese Application No. 201580049159.5, mailed on Jun. 9, 2020, 32 pages (English Translation Provided).

* cited by examiner

CROSS DEVICE APPLICATION DISCOVERY AND CONTROL

CROSS-REFERENCE TO RELATED APPLICATIONS

This application is a continuation of U.S. patent application Ser. No. 17/575,157 filed on Jan. 13, 2022, which is continuation of U.S. patent application Ser. No. 16/940,155 filed on Jul. 27, 2022, now Issued U.S. Pat. No. 11,228,640, which is a continuation of U.S. patent application Ser. No. 15/630,374, filed on Jun. 22, 2017, now Issued U.S. Pat. No. 10,728,314, which is a continuation of U.S. patent application Ser. No. 14/508,801, now Issued U.S. Pat. No. 10,171,558, which claims the benefit of U.S. Provisional Application No. 62/049,979, filed on Sep. 12, 2014, and which applications are incorporated herein by reference in their entireties. To the extent appropriate a claim of priority is made to each of the above-disclosed applications.

BACKGROUND

Devices, such as smartphones, personal computers, tablets, two-in-one devices, etc. are ubiquitous in society. People use these devices for multiple different tasks, each task being potentially executed by an application on the device. Often times, more than one application on a device is capable of executing a particular task. Additionally, many people own more than one device, each replete with multiple applications capable of executing tasks.

Applications, however, generally operate solely on one device, and lack the capability to communicate or seamlessly share information between devices. Thus, applications are limited based on device capabilities, such as processing speed, memory, and/or display size. For example, an application running a video on a smartphone is limited to the smartphone device display.

SUMMARY

This disclosure describes systems and methods for cross device application discovery and control. Cross device application discovery and control can provide for detection, activation, and control of applications on target devices. In some examples, cross device application discovery and control can provide for activation and control of background tasks on target devices. Cross device application discovery and control can provide for a source device to discover trusted target devices connected via a network, and capable of executing a task. Cross device application discovery and control can also provide for a source device to discover one or more applications capable of executing a task. Thus, responsive to the source device sending an application discovery query, one or more target devices can respond with respective device and/or application capabilities. Responsive to receiving device and application capabilities, the source device can select an application on one or more target devices to execute a task.

Cross device application discovery and control can provide for a source device to control applications on one or more remote devices in a master and slave configuration. Thus, after the source device selects an application on the one or more target devices, the source device can send an activation message instructing the one or more target devices to activate the application and run a particular task in the application. In some examples, the application can run a task on the one or more target devices, and send task context data associated with the task to a display on the target device. In some examples, the application can run the task on the one or more target devices, and stream task context data associated with the task to the source device to be presented on a display. Cross device application discovery and activation can be enabled on a single operating system, or across a plurality of operating systems.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
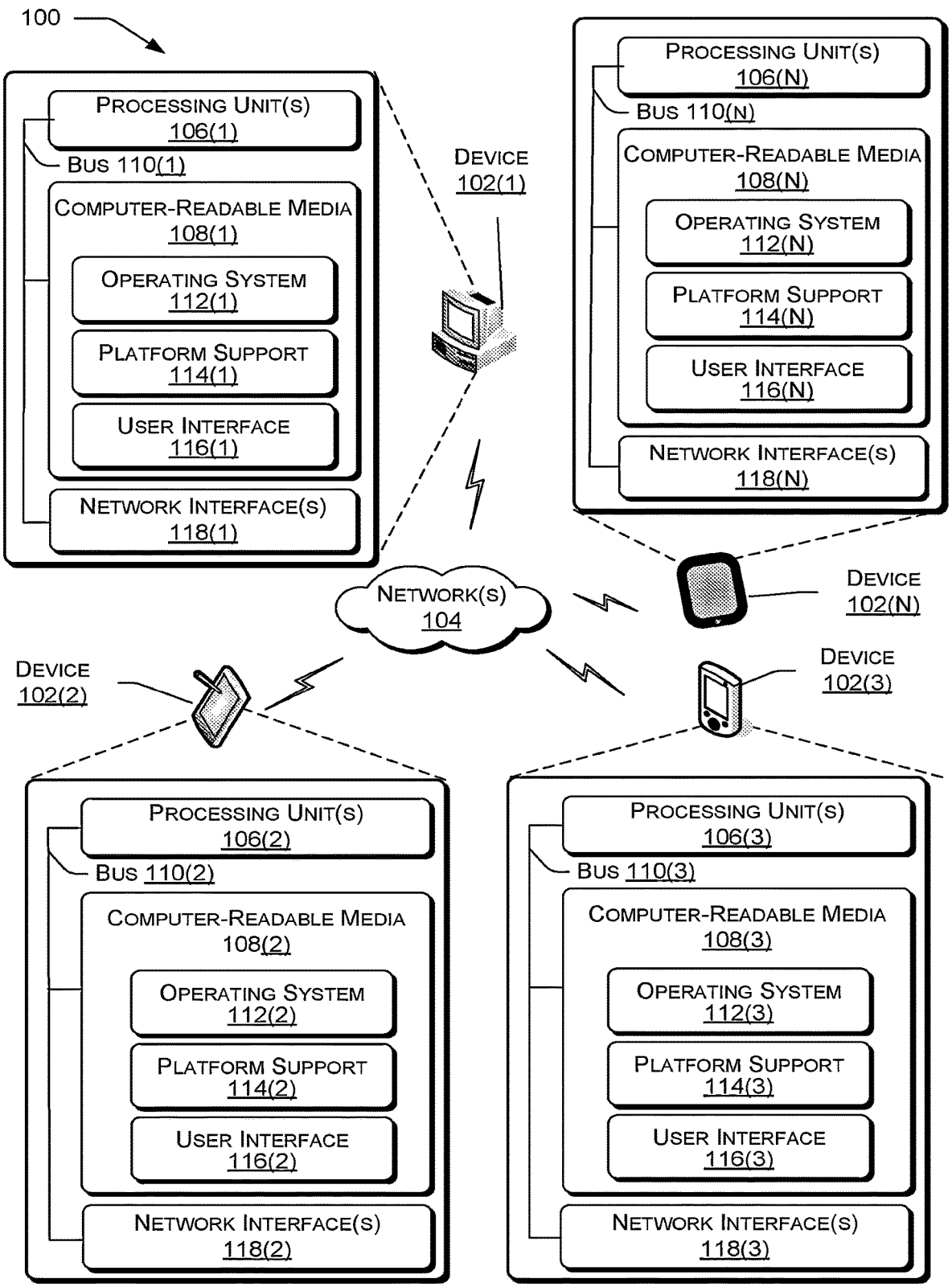
FIG. 1 is a pictorial diagram that illustrates an example environment of a cross device application discovery and control system.

This disclosure describes methods and systems that enable discovery and/or control of applications across devices and/or operating systems. Cross device application discovery and control can provide for detection and/or control of applications on remote devices. The discovery and/or control of applications can occur on multiple active devices trusted by a user. In some example implementations, a device can be trusted if the device is configured on a user profile, a group profile, and/or is otherwise authenticated by a user.

Discoverability of devices can be based on a device being powered on, off sleep mode, off airplane mode, or any other action that causes the device to become available over a network. The availability over a network can be determined by, for example, Wi-Fi sensors, Bluetooth™ sensors, proximity sensors, wired connections, or any other sensors capable of detecting network interfaces.

Cross device application discovery and control can provide a way for a source device to discover active trusted remote devices on a network. The network can include any wired or wireless network capable of connecting at least two devices. Cross device application discovery and control can also provide a way for a source device to discover applications located on the active trusted remote devices.

Cross device application discovery and control can provide a way of querying one or more remote devices for one or more applications capable of executing a particular task. Responsive to the query, the one or more remote devices can respond with application capability information for applications capable of executing the task. In some examples, the one or more remote devices can also respond with device capability information of the one or more remote devices.

Cross device application discovery and control can provide a way for a source device to select an application on the one or more remote devices for execution of the task. Responsive to the selection, the source device can control the application on the one or more remote devices. As used herein, examples of control can include, but are not limited to, an instruction to play, pause, resume, stop, refresh, cancel, and/or execute any other task lifetime management function of an application. The source device and the one or more target devices in the cross device application discovery and control system can thus be connected in a master and slave configuration.

In some examples, cross device application discovery and control can provide for display on the one or more target devices. In various examples, cross device application discovery and control can provide for display on the source device.

Cross device application discovery and control can also be enabled across devices with different operating systems. For example, a first device may be configured to run on a WINDOWS operating system, and it may perform cross device application discovery and control communications with a second device configured to run on a LINUX, ANDROID operating system, an iOS™ operating system, or another operating system.

Illustrative Environment

The environment described below constitutes but one example and is not intended to limit the claims to any one particular operating environment. Other environments can be used without departing from the spirit and scope of the claimed subject matter.

Cross device application discovery and control allows for the discovery and control of applications on one or more remote devices. The discovery can include locating a device with at least one application capable of executing a particular task. A task can support a particular user activity through an application on a device, such as watching a movie, reading a news article, writing a document, or a myriad of other activities.

For example, a user may be watching a movie on a video application on a smartphone, and may arrive at a location with a smart television. The smartphone may connect to the smart television over a network, and discover at least one video application on the smart television capable of playing the movie. The smartphone may determine that the smart television is a trusted device, and may send an activation message to a video application on the smart television, directing it to play the movie. The movie may then be displayed on the smart television, while the smartphone maintains control of the video application on the smart television. In some examples, the movie may be played in the video application on a smart television, and displayed on the smartphone. In various examples, the movie may be played in the video application on the smart television, and displayed on the smart television and the smartphone concurrently.

FIG. 1 shows an example environment 100 in which cross device application discovery and control may be implemented. Device(s) 102 and/or components of environment 100 can include a diverse variety of device types configured to communicate via one or more networks 104, and are not limited to any particular type of device. In some examples, device(s) 102, such as 102(1) can include stationary devices, including but not limited to servers, desktop computers, personal computers, network-enabled televisions, terminals, game consoles, set-top boxes, gaming devices, work stations, and thin clients, such as those capable of operating a distributed computing resource. In some examples, device(s) 102, such as 102(2), can include mobile devices, including but not limited to mobile phones, tablet computers, mobile phone tablet hybrids, personal data assistants (PDAs), laptop computers, media players, personal video recorders (PVRs), cameras, and any other mobile computers or any other mobile telecommunication devices. In some examples, device(s) 102, such as 102(3), can include embedded devices, including but not limited to wearable computers, implanted computing devices, automotive computers, computer navigation type devices, such as satellite-based navigation systems including global positioning system (GPS) devices and other satellite-based navigation system devices, appliances, and integrated components for inclusion in a computing device. In various examples, device(s) 102, such as device 102(N), can include any other sort of computing device configured to communicate via one or more network(s) 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Device(s) 102 can include any computing device having one or more processing unit(s) 106 operably connected to computer-readable media 108 such as via a bus 110, which in some instances can include one or more of a system bus, a data bus, an address bus, a PCI bus, a Mini-PCI bus, and any variety of local, peripheral, and/or independent buses.

Executable instructions stored on computer-readable media 108 can include, for example, an operating system 112, a platform support 114, a user interface 116, and other modules and programs that are loadable and executable by processing units(s) 106.

The operating system 112 on device(s) 102 can be any operating system including but not limited to MICROSOFT WINDOWS, WINDOWS PHONE, QNX™, IBM z/OS™, LINUX, ANDROID, iOS™, OS X™, NETBSD™, or any other operating system capable of managing computer hardware and software resources. In some examples, devices 102(1) and 102(2) can include operating system 112, such as MICROSOFT WINDOWS. In various examples, device 102(1) can include operating system 112(1), such as a MICROSOFT WINDOWS, while device 102(2) can include operating system 112(2), as ANDROID. The platform support 114 represents cross device application discovery and control.

The user interface 116 on device(s) 102 can operate in conjunction with an I/O interface to enable executable instructions based at least on a user input. The user interface 116 can be activated by at least one of a touch input, a pen input, a mouse click, a keyboard selection, voice input, gesture input, or any other input mechanism.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) 102 can also include one or more network interface(s) 118 to enable communications between device 102(1) and other networked devices involved in task continuity such as devices 102(2)-102(N). Such network interface(s) 118 can include one or more network interface controllers (NICs) or other types of transceiver devices to send and receive communications over a network. For example, network interface(s) 118 can include proximity interfaces to further enable communications between device(s) 102(1) and other networked devices involved in cross device application discovery and/or control, such as devices 102(2)-102(N). Such proximity interfaces can include one or more proximity network interface controllers or other types of transceiver devices to send and receive communications over a proximity network.

Figure 2:
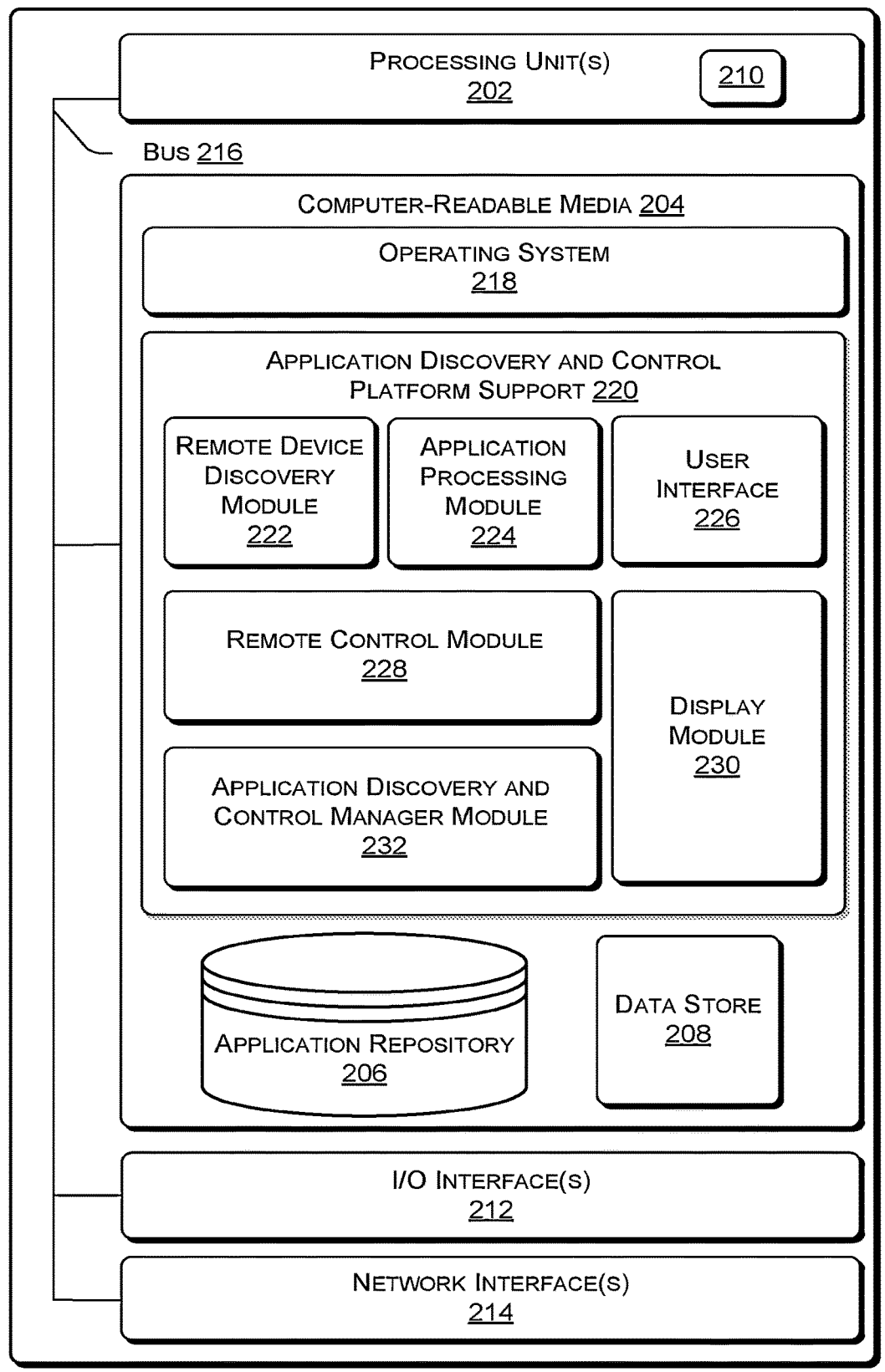
FIG. 2 is a block diagram that illustrates select components of an example device including a cross device application discovery and control system consistent with FIG. 1.

FIG. 2 illustrates an example device 200 including a cross device application discovery and control system, such as a device 102 from FIG. 1. In device 200, processing unit(s) 202 can represent, for example, a CPU-type processing unit, a GPU-type processing unit, a field-programmable gate array (FPGA), another class of digital signal processor (DSP), or other hardware logic components that may, in some instances, be driven by a CPU.

In some examples, device 200 can be one of a plurality of devices, such as devices 102(1), 102(2), and 102(N), which are capable of connection via a network. In some examples, computer-readable media 204, which can be computer-readable media 108, can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In some examples at least one CPU, GPU, and/or accelerator is incorporated in device 200, while in other examples one or more of a CPU, GPU, and/or accelerator can be external to device 200.

In the illustrated example, computer-readable media 204 also includes an application repository 206. In some examples, application repository 206 includes application storage such as an application database, application data warehouse, or other type of structured or unstructured application data storage. In various examples, the application repository 206 stores application information such as file size, operating system, capabilities, and any other information specific to an application.

In the illustrated example, computer-readable media 204 also includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 208 can store data for the operations of processes, applications, components, and/or modules stored in computer-readable media 204 and/or executed by processing unit(s) and/or accelerator(s) 202. Data store 208 can further store device capability data including device memory, device speed, and/or device display capability. Alternately, some or all of the above-referenced data can be stored on separate memories 210 on board one or more processing unit(s) 202.

Device 200 can further include one or more input/output (I/O) interfaces 212 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device 200, network interface(s) 214, which can be network interface(s) 118, can represent, for example, network interface controllers (NICs) or other types of transceiver devices to send and receive communications over a network.

In the illustrated example, device 200 can operably connect the processing unit(s) 202 to computer-readable media 204, I/O interface(s) 212, and network interface(s) 214 via a bus 216, which corresponds to bus 110.

In the illustrated example, computer-readable media 204 also includes an operating system 218, which can be operating system 112.

Computer-readable media 204 also includes an application discovery and control platform support ("platform support") 220, which can be platform support 114. Platform support 220 can include one or more modules and/or application programming interfaces (APIs), which are illustrated as blocks 222, 224, 226, 228, 230, and 232, although this is just an example, and the number can vary higher or lower.

Functionality described associated with blocks 222, 224, 226, 228, 230, 232, 234, and 236, can be combined to be performed by a fewer number of modules and/or APIs, or it can be split and performed by a larger number of modules and/or APIs. For example, block 222 can represent a remote device discovery module. Remote device discovery module 222 can include logic to search for remote devices, such as device(s) 102, via network interface 214. The remote device discovery module 222 can be an ALLJOYN module or any other module capable of discovering remote devices over a network. In some examples, the remote device discovery module 222 can periodically search for remote devices. In some examples, the periodic interval can be a user specified time, as set in user preferences. In various examples, the remote device discovery module 222 can search for remote devices based on a user input via I/O interface 212.

In the illustrated example, the platform support can also include an application processing module 224. In some examples, application processing module 224 includes logic to program processing unit(s) 202 of device 200 for extraction of application capability data from the application repository module 206, and/or an external data store. Application capability data includes data that indicates the ability of an application to perform a particular task, the speed of an application, and/or other application performance data. In some examples, application processing module 224 can include logic to program processing unit 202 for extraction of user preference data including a user preferred application for performing a particular task, frequency of application use, time spent running an application on a device, and/or any other data that would indicate a user preference.

In some examples, application processing module 224 can include logic to instruct an application to execute a particular on device 200. Application processing module 224 can further include logic to send task context data associated with the task being executed to the display module for presentation on a display on device 200.

In the illustrated example, platform support 220 can include a user interface 226, which can be user interface 116. User interface 226 can include logic to respond to input via the I/O interface(s) 210. User interface 226 can be activated by at least one of a touch input, a pen input, a mouse click, a keyboard selection, and/or any other input mechanism. The input can include an application discovery query, an application selection, an application activation and/or control input, and/or a background task activation and/or a control input. Responsive to receiving a discovery query via the I/O interface(s) 210, the user interface 226 enables the remote control module 228 to send the discovery query to one or more remote devices. Responsive to receiving an application activation and/or control input, and/or a background task activation and/or control input, user interface 226 enables the remote control module 228 to send a respective message to the one or more remote devices.

Remote control module 228 can be a function of platform support 220 operable when device 200 operates as a source device. Remote control module 228 can include logic to program the processing unit(s) 202 for the extraction a user profile, a group profile, a user preference for trusting remote devices, and/or any other trust factors used to determine the trustworthiness of a remote device, from the data store 208.

Remote control module 228 can include logic to apply the user profile, group profile, user preference for trusting remote devices, and/or any other trust factors to determine the trust of one or more remote devices. In at least one example, a trust at or above a user specified trust level results in the remote device being labeled as trusted.

In some examples, the trust can be based upon the remote device user profile and/or group profile matching the user profile and/or group profile on device 200. In some examples, the trust can be based on the user preference for trusting remote devices. For example, a user preference for trusting remote devices may be set to a level such that remote control module 228 determines that a plurality of devices, such as device 102(1)-102(N), connected via a network, are trusted. For another example, a user preference for trusting remote devices may be set to a level such that remote control module 228 determines that only a few of the plurality of devices, such as 102(1)-102(3) are trusted.

Remote control module 228 can further include logic to save a list of one or more trusted remote devices in a cache. In some examples, the cache can be updated in response to the remote control module 228 determining the trust of one or more remote devices.

Remote control module 228 can include logic to program the processing unit(s) 202 to cause remote device discovery module 222 to open a communication channel between device 200 and one or more trusted remote devices, via network interface 214. The communication channel can provide for data transfer between devices, such as messages and/or task context data including text, images, and/or any other data associated with a particular application task. The communication channel can remain open until a device is no longer discoverable, a device is no longer trusted, and/or an input via user interface 226 disconnects a device.

Remote control module 228 can further include logic to send one or more serialized messages to one or more trusted remote devices, such as device 102(N), via network interface 214. The one or more serialized messages can include an application discovery query, an application activation message, an application control message, a background task activation message, and/or a background task control message. In some examples the serialized messages can be JavaScript Object Notation format, YAML format, XML format, or any other format that can be used to transmit data.

In some examples, remote control module 228 can include logic to send an application discovery query to one or more trusted target devices. The application discovery query can be based at least in part on input through the user interface 226, the input being at least a query for an application capable of performing a particular task. The application discovery query can include a request for application capability data on the one or more trusted devices, including the ability of an application to perform the particular task, the speed of an application, and/or other application performance data. The application discovery query can further include a request for device capability data, such as device memory, speed, and/or display capability, for the one or more trusted devices.

Remote control module 228 can include logic to receive one or more discovery response messages from the one or more trusted remote devices. In some examples, the one or more discovery response message can include at least one application capable of performing the task on the one or more trusted remote devices, application capabilities for the at least one application, and/or device capabilities for the one or more trusted remote devices. In some examples, the one or more discovery response messages can include a notification that a remote device and/or application on a remote device is not capable of executing the task.

In some examples, remote control module 228 can include logic to select an application on one or more trusted remote devices, based at least in part on the one or more discovery response messages. The selection can be based on application capabilities, remote device capabilities, a trust of the remote device, a user profile of the remote device, a group profile of the remote device and/or a user preference. In some examples, remote control module 228 can select an application on a particular remote device. In various examples, remote control module 228 can select an application on more than one remote devices such that the task may be executed on more than one remote device concurrently.

Remote control module 228 can further include logic to send an application activation message, an application control message, a background task activation message, and/or a background task control message to one or more trusted remote devices via network interface 214. In various examples, application and/or background task activation and/or control messages can be based at least in part on user input via user interface 226. In some examples, the remote control module 228 can send application and/or background task activation and/or control messages based on input from an application on the source device. In some examples, the application activation message, application control message, background task activation message and/or background task control message can contain one or more API hooks, the one or more API hooks allowing for remote control of the application and/or background task.

In some examples, remote control module 228 can include logic to receive application and/or background activation and/or control response messages from the one or more trusted remote devices. The application and/or background task activation and/or control response messages can include at least a notification of a successful activation and/or control of the application and/or background task on the one or more trusted remote devices. In some examples the application and/or background task activation and/or control response message can include a notification of a successful presentation on a display on the one or more trusted remote devices.

In some examples, the application and/or background task activation and/or control response messages can include task context data associated with a task running on an application on the source device. The task context data can include text, images, and/or any other data associated with the task running on the application. In such examples, the application and/or background task activation and/or control response messages can include streaming data, such that the task context data input is updated in the streaming data. The remote control module 228 can include logic to process the streaming data, and send it to display module 230 for display on device 200.

In the illustrated example, platform support 220 can include an application discovery and control manager module 232. Application discovery and activation manager module 232 can be a function of platform support 220 operable when device 200 operates as a target device. Application discovery and control manager module 232 can include logic to receive one or more serialized messages from a source device, such as device 102(N), via network interface 214. The one or more serialized messages can include an application discovery query, an application activation message, an application control message, a background task activation message, and/or a background task control message. In some examples the serialized messages can be JavaScript Object Notation format, YAML format, XML format, or any other format that uses human-readable text to transmit data.

Application discovery and activation manager module 232 can include logic to program processing unit(s) 202 for extraction of application capability data from application repository 206. Application capability data can include data that indicates the ability of an application to perform a particular task, the speed of an application, and/or other application performance data. Application discovery and activation manager module 232 can further include logic to program processing unit(s) 202 for extraction of device capability data from data store 208. Device capability data can include device memory, speed, and/or display capability, for the one or more trusted devices.

Application discovery and control manager module 232 can include logic to receive an application discovery query from a source device. The application discovery query can request at least the existence of an application on the remote device capable of executing the task, and/or the remote device capability to execute a task. Application discovery and control manager module 232 can include logic to pool application capability data extracted from the application repository 206 and device capability data extracted from the data store, and generate one or discovery response messages. In some examples, the discovery response messages can be serialized messages.

Application discovery and control manager module 232 can include logic to send the discovery response message to the source device, the discovery response message including application capability data, device capability data, the lack of an application capable of executing the task, and/or the inability of the remote device to support the task running on the application.

Application discovery and control manager module 232 can include logic to receive an application activation message, an application control message, a background task activation message, and/or a background task control message from a source device. The application and/or background task activation and/or control message can include one or more API hooks, the one or more API hooks allowing for remote control of the application and/or background task.

Responsive to receiving an application and/or background task activation and/or control message, application discovery and control manager module 232 can allow the remote activation and/or control of an application and/or background task. For example, the remote control on the source device can send an application activation message, such as a message to activate a video application and play a movie. The application discovery and control manager module 232 may receive the message, and responsive to the message, activate the application and play the movie. For another example, a target device may be playing a movie on a video application. The application discovery and control manager module 232 may receive an application control message from a source device, the application control message instructing the video application to pause the movie. Responsive to receiving the application control message, the application discovery and control manager module 232 may pause the movie.

Application discovery and control manager module 232 can include logic to send an activation response message to the source device. In some examples, the activation response message can include a notification of a successful activation and/or control of an application and/or background task on the target device. In some examples, the activation response message can include a notification of a successful presentation of task context data on a display on the target device, the task context data associated with the task running on the application. In such examples, the application model discovery and control manager module 232 can include logic to send the task context data associated with the task running in the application on the target device to display module 230.

In some examples, the activation response message can include task context data for presentation on a display on the source device. For example, a user may want the results of a complex computation to display on a smartphone, but the smartphone may not be capable of executing the computation. In response to a user input for the computation via the user interface, the smartphone remote control module may send a discovery request query to one or more remote trusted devices. The discovery request query may include an indication of the ability of an application and/or device to execute the complex computation. One of the trusted remote devices may be a desktop computer, such as device 102(1). The application discovery and control manager module 232 on the desktop computer may send a discovery response message with both application and device capability data, indicating that both the application and device are capable of executing the task. Responsive to the discovery response message, the remote control module on the smartphone may send an application activation message.

Responsive to the application activation message, the application discovery and control manager module 232 on the desktop computer may activate the application, execute the task, and send an activation response message. The activation response message can include task context data with the results of the complex computation. The remote control module on the smartphone may route the task context data to the display module, such as display module 230, for presentation on a display on the smartphone.

In some examples, the display module 230 includes logic to present, on a display, task context data associated with a task being executed on an application on device 200. In some examples, device 200 can operate as a source device, and the remote control module 228 can send streaming task context data for a task being executed on a remote application to the display module 230. In some examples, device 200 can operate as a target device, and the application discovery and activation manager 232 can activate and/or control task execution on an application on device 200. In such examples, the application discovery and activation manager 232 can include logic to program the application processing module 224 to send task context data to display module 230 for display on device 200.

Figure 3:
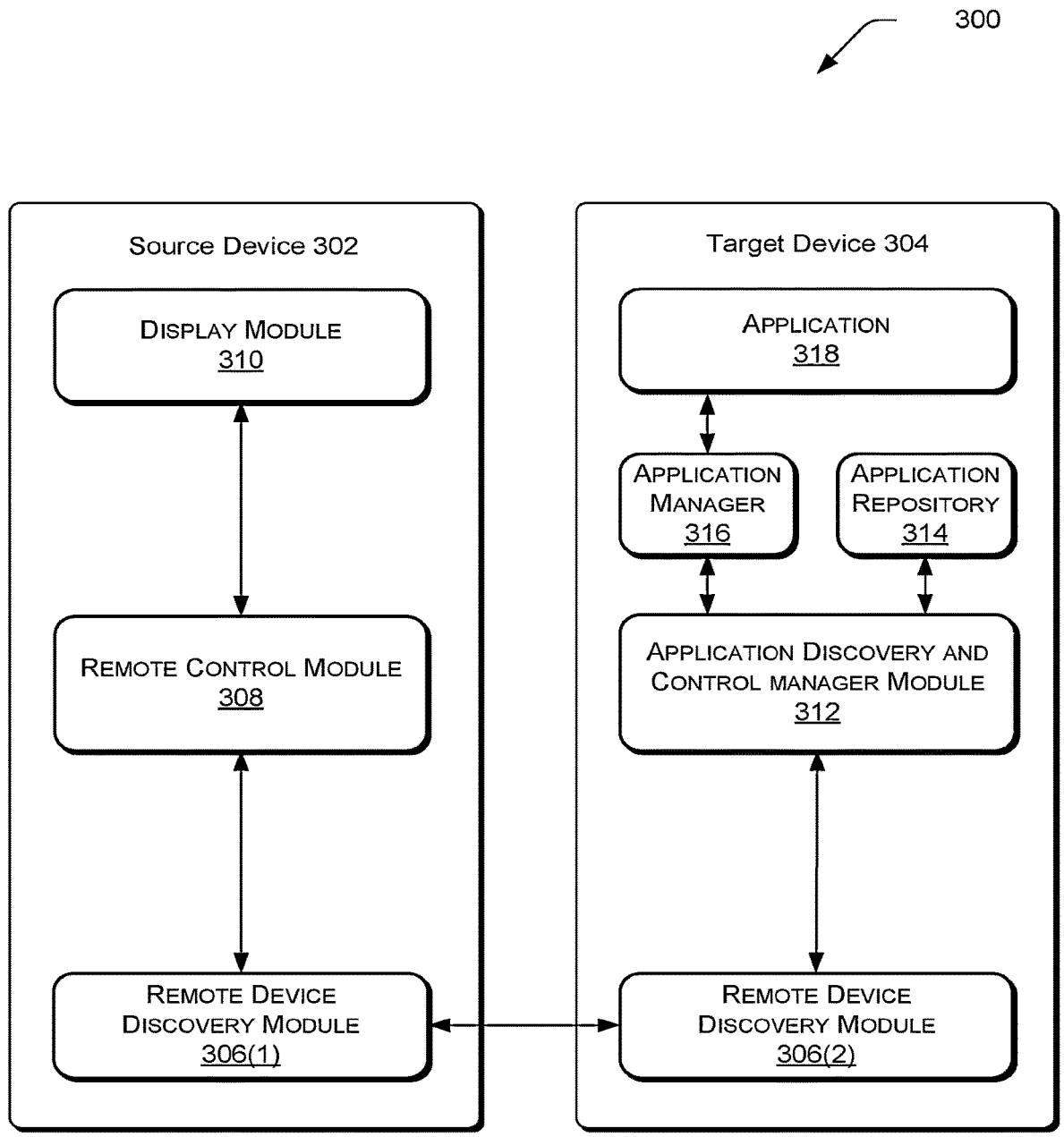
FIG. 3 is a block diagram that illustrates select components of an example source device and an example target device including a cross device application discovery and control system.

FIG. 3 illustrates select components of an example source device and an example target device, each including a cross device application discovery and control system, such as devices 102(1) and 102(2). In the illustrated example, source device 302 can operate as a source device, and target device 304 can operate as a target device, although this is just an example, and each device 302 and 304 can include both source device and target device modules. Source device 302 can enable the remote discovery, activation, and control of applications and/or background tasks on target device 304. Target device 304 can enable the discovery, and can allow the source device 302 to seamlessly activate and control one or more applications on target device 304.

Functionality of source device 302, described associated with blocks 306(1), 308, and 310, can be combined to be performed by a fewer number of modules and/or APIs, or can be split and performed by a larger number of modules and/or APIs. Similarly, functionality of target device 304, described associated with blocks 306(2), 312, 314, 316, and 318 can be combined to be performed by a fewer number of modules and/or APIs, or can be split and performed by a larger number of modules and/or APIs.

In the illustrated example, source device 302 can include a remote device discovery module 306(1), corresponding to remote device discovery module 222.

In some examples, source device 302 can discover target device 304 via remote device discovery modules 306(1) and 306(2). In various examples, remote device discovery modules 306(1) and 306(2) can provide a communication channel between source device 302 and target device 304. Responsive to discovering target device 304, remote device discovery module 306(1) can receive target device 304 trust information. Target device 304 trust information can include target device user profile, target device group user profile and/or any other data used to determine the trustworthiness of a remote device. Remote device discovery module 306(1) can send target device trust information to remote control module 308, corresponding to remote control module 222.

Remote control module 308 can receive target device trust information from remote device discovery module 306(1), and compare it to source device 302 trust settings. Target device trust information can include a user profile, a group profile, and/or any other information used to determine if the target device can be trusted. Source device 302 trust settings can include a user profile, a group profile, a user preference for trusting remote devices, and/or any other trust factors used to determine if a remote device 304 can be trusted.

In some examples, the trust can be based upon the target device 304 user profile and/or group profile matching the user profile and/or group profile on source device 302. In some examples, the trust can be based on the user preference for trusting remote devices. For example, a user preference for trusting remote may be set to a level such that model remote control module 308 may determine that a plurality of devices, such as device 102(1)-102(N), are trusted. For another example, a user preference for trusting remote devices may be set to a level such that remote control module 308 may determine that only a few of the plurality of devices, such as 102(1)-102(3), are trusted.

Responsive to the determination that target device 304 is a trusted device, remote control module 308 can save the target device to a cache. In some examples, responsive to the determination that target device 304 is a trusted device, remote control module 308 can open a communication channel between source device 302 and target device 304 via remote device discovery modules 306(1) and 306(2). The communication channel can provide for data transfer between devices, such as messages and/or task context data including text, images, and/or any other data associated with a particular application task. The communication channel can remain open until a device is no longer discoverable, a device is no longer trusted, and/or an input on a user interface, such as user interface 226, disconnects a device.

In some examples, remote control module 308 can send one or more serialized messages to target device 304 via the communication channel. The one or more serialized messages can include an application discovery query, an application activation message, an application control message, a background task activation message, and/or a background task control message.

In some examples, remote control module 308 can send an application discovery query to the application discovery and control manager module 312 on target device 304. The application discovery query can be based at least in part on input through the user interface, such as user interface 226. The input through the user interface can be a query for an application capable of performing a particular task. The application discovery query can include a request for application capability data on the one or more trusted devices, including the ability of an application to perform a task, the speed of an application, and/or other application performance data. The application discovery query can further include a request for device capability data, such as device memory, speed, and/or display capability for the one or more trusted devices.

Responsive to receiving the application discovery query, application discovery and control manager module 312 can extract application capability data from application repository 314. Application capability data can include the ability of an application to perform a task, the speed of an application, and/or other application performance data. In some examples, responsive to receiving the application discovery query, application discovery and control manager module 312 can extract device capability data from a data store, such as data store 208. Device capability data can include device memory, speed, and/or display capability for the one or more trusted devices.

Application discovery and control manager module 312 can pool application capability data for one or more applications capable of executing the task and/or device capability data. Application discovery and control manager module 312 can send the application and/or device capability data to remote control module 308 in a discovery response message. In some examples, the discovery response message can include a notification of the lack of an application capable of executing the task and/or the inability of the remote device 304 to support the task running on an application.

Responsive to receiving capability data for one or more applications on target device 304, an application on source device 302 can select a preferred application for executing the task via remote control module 308. In some examples, a user can select the preferred application for executing the task via a user interface in model remote control module 308. The selection can be based on application capabilities, remote device capabilities, a trust of the remote device, a user profile of the remote device, and/or user preference. In various examples, the application and/or user can select the preferred application on more than one remote devices such that the task may be executed on more than one remote device concurrently.

In some examples, remote control module 308 can send an application and/or background task activation and/or control message to the application discovery and control manager module 314 on target device 304 via the communication channel. In some examples, the application and/or background task activation and/or control message can include an application activation message, an application control message, a background task activation message, and/or a background task control message. In various examples, application and/or background task activation and/or control messages can be based at least in part on user input via a user interface, such as user interface 226. In some examples, the application and/or background task activation and/or control message can contain one or more API hooks, the one or more API hooks allowing for remote control of the application and/or background task.

Responsive to receiving an application and/or background task activation and/or control message, application discovery and control manager module 314 can send a signal to an application manager 316 to allow the remote activation and/or control of an application and/or background task. The signal can include the activation and/or control data directed by remote control module 308 in source device 302. In some examples, application manager 316 can be combined with application discovery and control manager module 312. In some examples, application manager 316 can be a separate module, operably connected to application discovery and control manager module 312.

In some examples, application manager 316 can activate and/or control application 318. For example, the remote control module on the source device can send an application activation message, such as a message to activate a video application, such as application 318, and play a movie. The application discovery and control manager module 314 can receive the application activation message, and send the application activation message to application manager 316. Responsive to receiving the application activation message, application manager 316 can activate the video application and play the movie on target device 304. For another example, target device 304 may be playing a movie on a video application, such as application 318. The application discovery and control manager module 314 may receive an application control message from source device 302 with an instruction to pause the movie. Application discovery and control manager module 314 may send the application control message to the application manager 316. Responsive to the application control message, application manager 316 may pause the movie on application 318.

In some examples, application discovery and control manager module 314 can send an application and/or background task activation and/or control response message to remote control module 308. In some examples, the application and/or background task activation and/or control response message can include a notification of successful activation and/or control of an application and/or background task on target device 304. In some examples, the application and/or background task activation and/or control response message can include a notification of the successful presentation of a task on the application on a display on target device 304.

In some examples, the application and/or background task activation and/or control response message can include streaming task context data for presentation on display 310 of source device 302. The task context data can include text, images, and/or any other data associated with a task running on an application. The remote control module 308 can include logic to process the streaming data, and send it to display module 310 for display on source device 302.

For example, the source device 302 may be a smartphone. A user may want the results of a complex computation to display on source device 302, but the smartphone may not be capable of executing the computation. In response to a user input for the computation via the user interface, remote control module 308 may send a discovery request query to one or more remote trusted devices. The discovery request query may include the ability of an application and/or device to execute the complex computation. Target device 304 may be a desktop computer, such as device 102(1). Application discovery and control manager module 312 may send a discovery response message with both application 318 and target device 304 capability data, indicating that both application 318 and target device 304 are capable of executing the task. Responsive to the discovery response message, remote control module 308 may send an application activation message, instructing target device 304 to activate application 318.

Responsive to the application activation message, application discovery and control manager module 312 may signal to application manager 316 to activate the application and execute the task. Responsive to the application, application model discovery and control manager module 312 can send an activation response message to model remote control 308, the activation response message including a task context data with the results of the complex computation. Remote control module 308 may route the task context data to display module 310 for presentation on a display on the source device 302.

Figure 4:
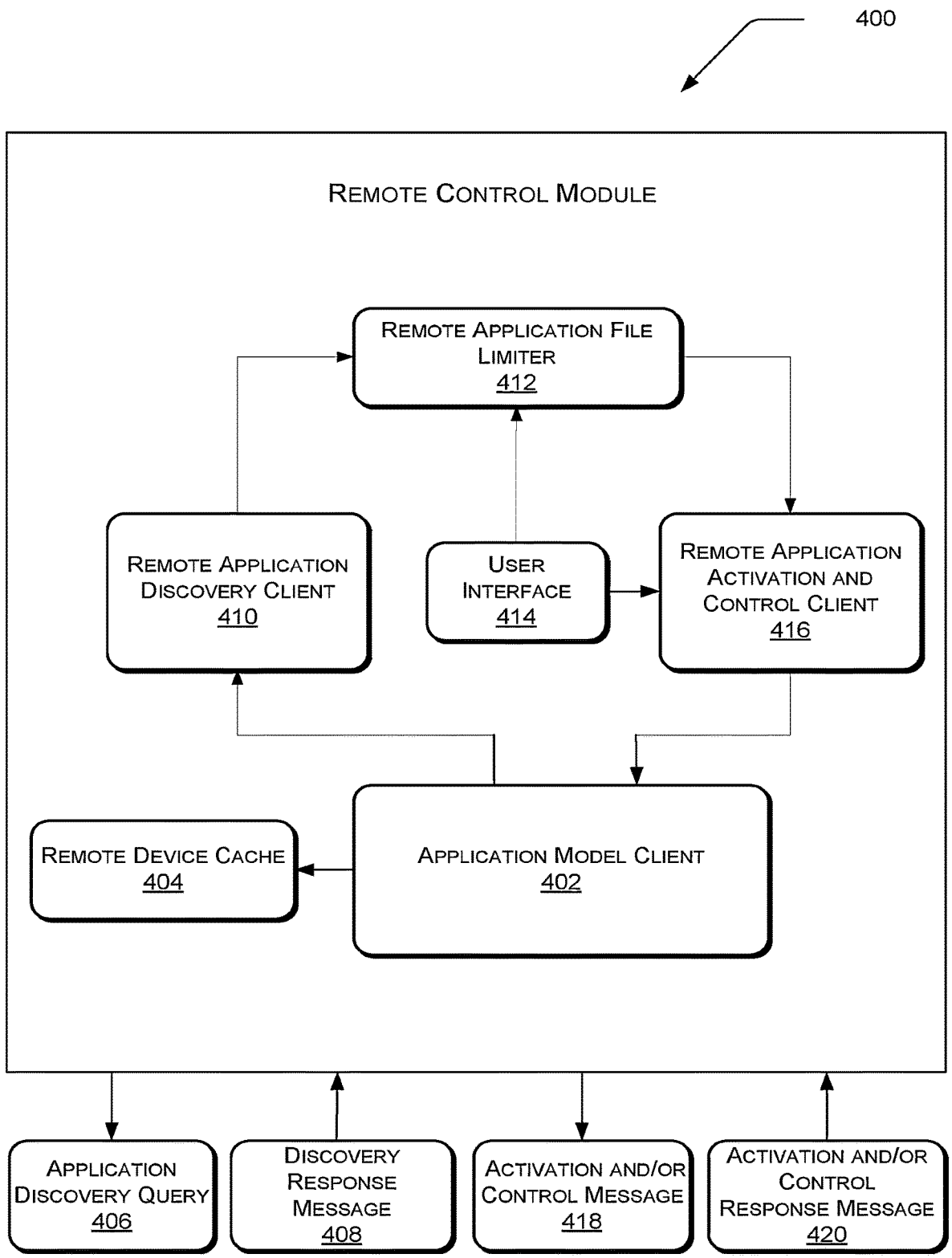
FIG. 4 is a block diagram that illustrates a cross device application control module of the cross device application discovery and control system.

FIG. 4 illustrates select components of a cross device application remote control module of the cross device application discovery and control system consistent.

Functionality described associated with blocks 402, 404, 406, 408, 410 and 412 can be combined to be performed by a fewer number of modules and/or APIs, or it can be split and performed by a larger number of modules and/or APIs. For example, block 402 can represent an application model client. Application model client 402 can receive a list of one or more discovered devices from a remote device discovery module, such as remote device discovery module 222. In some examples the list of the one or more discovered devices can include at least target device trust information. Target device trust information can include a user profile, a group profile, and/or any other information used to determine if the target device can be trusted. Source device 302 trust settings can include a user profile, a group profile, a user preference for trusting remote devices, and/or any other trust factors used to determine if a remote device 304 can be trusted.

In some examples, application model client 402 can determine the trust of one or more remote devices by comparing the trust information to the source device trust settings. In some examples, the one or more remote devices may be trusted based on the source device and the target device sharing a user and/or group profile. In some examples, the one or more remote devices may be trusted based on a user preference for trusting remote devices. For example, a user may set a preference to trust any devices discoverable on a network.

Responsive to determining the trust of the one or more remote devices, application model client 402 can store a list of trusted remote devices to remote device cache 404. Remote device cache 404 can provide for at least easy access to trusted remote devices.

In some examples, application model client 402 can send one or more serialized messages to one or more trusted remote devices, such as device 102(N), via a network interface. The one or more serialized messages can include an application discovery query, an application activation message, an application control message, a background task activation message, and/or a background task control message.

In some examples, application model client 402 can include logic to send an application discovery query 406 to one or more trusted target devices. The application discovery query 406 can be based at least in part on a user input via a user interface, the input being at least a query for an application capable of performing a task. The application discovery query 406 can include a request for application capability data on the one or more trusted devices, including the ability of an application to perform a task, the speed of an application, and/or other application performance data. In some examples, the application discovery query can include a request for device capability data, such as device memory, speed, and/or display capability for the one or more trusted devices.

In some examples, application model client 402 can receive one or more discovery response messages 408 from the one or more trusted remote devices. The one or more discovery response messages 408 can contain at least one application capable of performing the task on the one or more trusted remote devices, application capabilities for the at least one application, and/or device capabilities for the one or more trusted remote devices. In some examples, the one or more discovery response messages 408 can include a notification that a remote device and/or application on a remote device is not capable of executing the task.

Responsive to receiving the one or more discovery response messages 408, the application model client 402 can process the one or more discovery response messages, and send discovery response messages to remote application discovery client 410. In some examples, remote application discovery client 410 can determine a trust of an application in a discovery response message. The trust of applications can be based on user preference and/or application settings. In such examples, remote application discovery client 410 can apply the user preference and/or application settings to the one or more discovery response messages, and filter out untrusted applications.

In some examples, remote application discovery client 410 can process the application and/or device capability data of trusted applications, and consolidate the capability data for each respective trusted application into one or more remote application files. Remote application discovery client 410 can send the one or more remote application files to a remote application file limiter 412.

Remote application file limiter 412 can enable the selection of a remote application file from the one or more remote application files. In some examples, an application on the source device can select the remote application file. In various examples, a user can select the remote application file via a user interface 414.

In some examples, the selection of a remote application file can be based at least in part on application and/or device capability data. For example, three remote application files may be sent to the remote application file limiter 412, each remote application file being associated with an application capable of playing a movie. The remote application file limiter 412 may select the remote application file associated with an application on the device with the largest display. For another example, the remote application file limiter 412 may select the remote application file associated with an application preferred by a user.

Remote application file limiter 412 can send the selected remote application file to a remote application activation and control client 416. In some examples, the remote application activation and control client 416 can generate one or more application activation and/or control messages 418 via the application model client 402. In some examples, the application activation and/or control message 418 can be a serialized message. In some examples, the application activation and/or control message 418 can instruct a target device to activate and/or control an application. In various examples the application activation and/or control message 418 can instruct a target device to activate and/or control a background task.

In some examples, the one or more application activation and/or control messages 418 can be based at least in part on the remote application file received from the remote application file limiter 412. For example, the remote application activation and control client 416 may receive a remote application file associated with a NETFLIX application. In response to receiving the remote application file associated with the NETFLIX application, remote application activation and control client 416 may generate an application activation message, instructing the remote device to activate the NETFLIX application.

In some examples, remote application activation and control client 416 can generate application activation and/or control messages 418 based at least in part on input from user interface 418. For example, a user may want to pause a movie playing on the NETFLIX application on a remote device. The user may select a pause control on the user interface 414 via an I/O interface, such as I/O interface 212. The user interface 414 may send the input to the remote application activation and control client 416, which may generate an application activation and/or control message 418. The remote application activation and control client 412 may send the application activation and/or control message 418 to the remote device via the application model client 402, the application control message 418 instructing the remote device to pause the NETFLIX application.

In various examples, application model client 402 can receive activation and/or control response messages 420 from the target device. In some examples, the activation and/or control response messages 420 can include a notification of successful activation and/or control of an application and/or background task on target device. In some examples, the application and/or background task activation and/or control response message can include a notification of the successful presentation of a task on the application on a display on target device.

Figure 5:
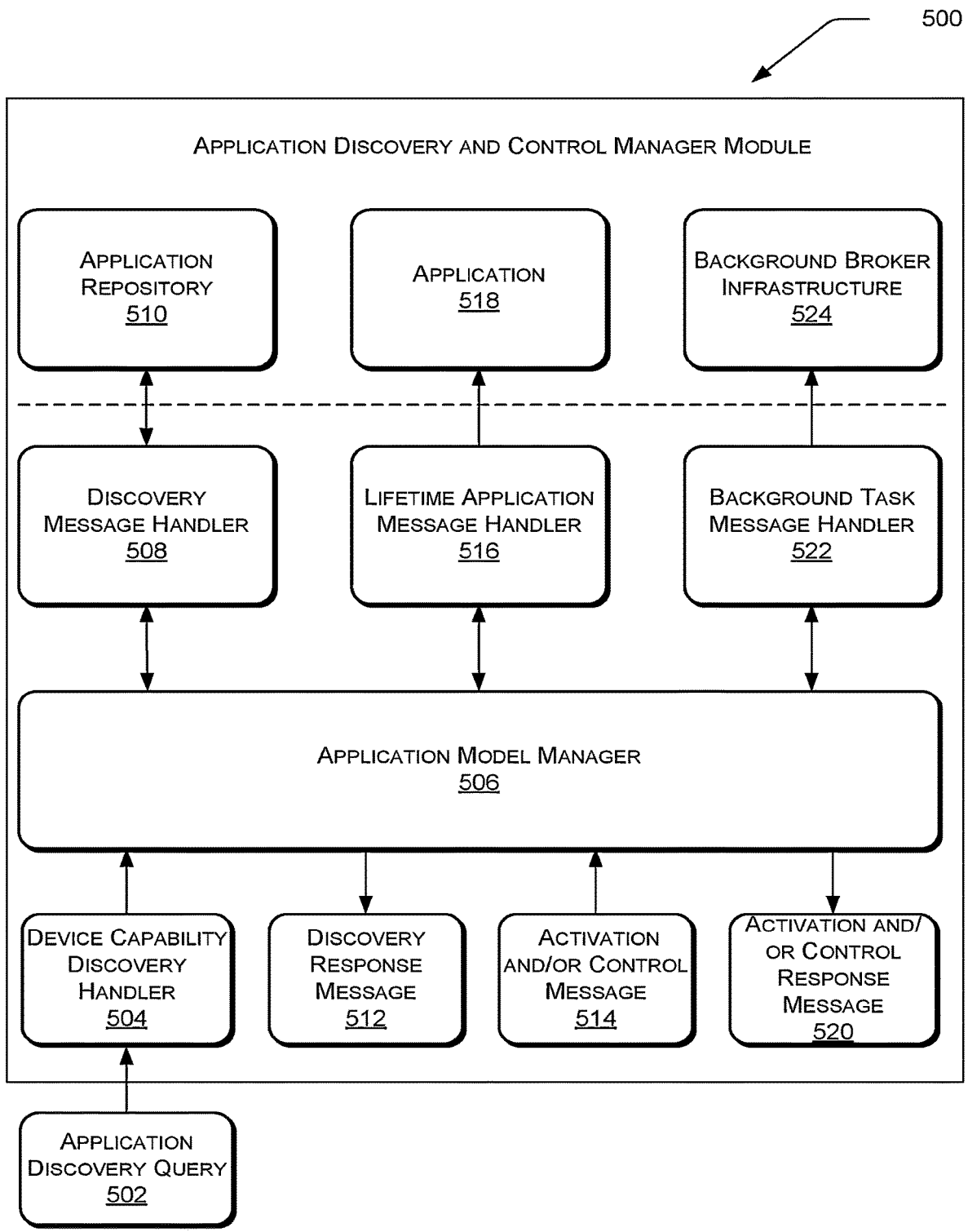
FIG. 5 is a block diagram that illustrates a cross device application discovery and control manager module of the cross device application discovery and control system.

FIG. 5 illustrates select components of a cross device application discovery and control manager module of the cross device application discovery and control system.

Functionality described associated with blocks 502, 504, 506, 508, 510, 512, 514, 516, 518 and 520 can be combined to be performed by a fewer number of modules and/or APIs, or it can be split and performed by a larger number of modules and/or APIs. For example, block 502 can represent an application discovery query sent from the source device and received by application model discovery and control manager module 500. In some examples, the application discovery query can be a serialized message.

In some examples, the discovery query can include a request for application capability data on the one or more trusted devices, including the ability of an application to perform a task, the speed of an application, and/or other application performance data. The application discovery query can further include a request for device capability data, such as device memory, speed, and/or display capability, for the one or more trusted devices.

Device capability discovery handler 504 can receive the application discovery query 502. In response to receiving the application discovery query 502, device capability discovery handler 504 can determine relevant device capability data, such as device capability data which can enable the device to support an application on the device to perform the requested task. For example, if the application discovery query 502 includes a request to play a movie on a video application, the relevant device capability data can include at least the device display capability.

Device capability discovery handler 504 can send the application discovery query 502 to application model manager 506 for further processing. Application model manager 506 can process the application discovery query 502, and request discovery message handler 508 to search an application repository 510 for one or more applications capable of performing the task. Discovery message handler 508 can send the application model manager 506 a message listing the one or more applications and respective application capability data. Application model manager 506 can process the message from discovery message handler 508, and send it to the source device via a discovery response message 512. In some examples, discover response message 512 can be a serialized message.

In the illustrated example, block 514 can represent an activation and/or control message sent from the source device and received by application model discovery and control manager module 500. In some examples, the activation and/or control message 514 can be a serialized message.

In some examples, the activation and/or control message 514 can be an application activation message and/or an application control message. In such examples, application model manager 506 receives the activation and/or control message 514, and processes the message. Responsive to receiving the activation and/or control message 514, the application model manager 506 can send a signal to application lifetime message handler 516 to activate and/or control the application 518. Application lifetime message handler can send the source device, via the application model manager 506, an application activation and/or control response message 520 including at least a notification of a successful activation and/or control of application 518. In some examples, the application activation and/or control response message 520 can include task context data associated with a task running on application 518.

In some examples, the activation and/or control message 514 can be a background task activation message, and/or a background task control message. In such examples, application model manager 506 receives the activation and/or control message 514, and processes the message. Responsive to receiving the activation and/or control message 514, the application model manager 506 can send a signal to background task message handler 522 to activate and/or control a background task via background broker infrastructure 524. Background task message handler 522 can send the source device, via the application model manager 506, an activation and/or control response message 520 including at least a notification of a successful activation and/or control of the background task.

Illustrative Processes

Figure 6:
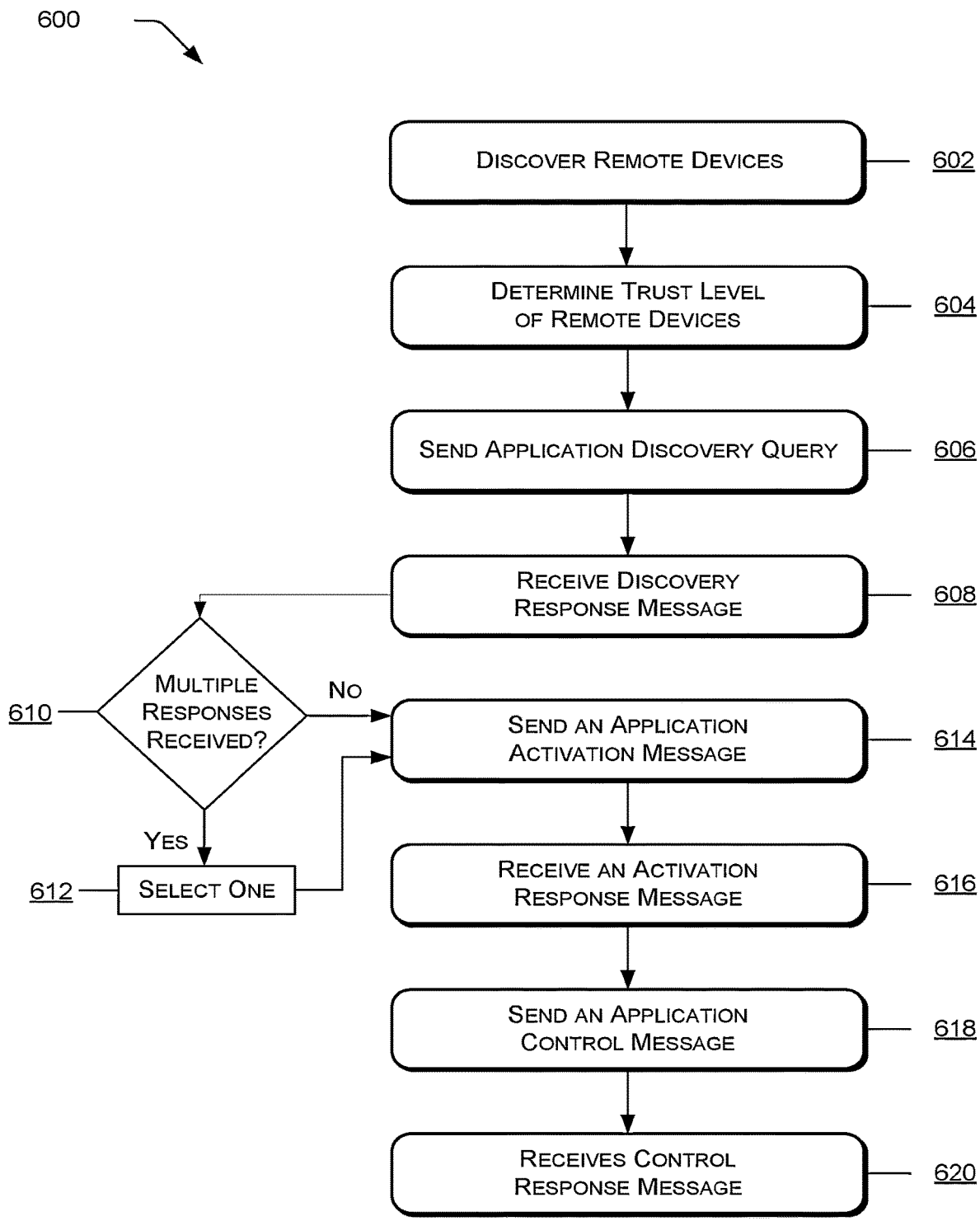
FIG. 6 is a flow diagram that illustrates a process flow of application discovery, activation, and control from a source device using a cross device application discovery and activation system.
Figure 7:
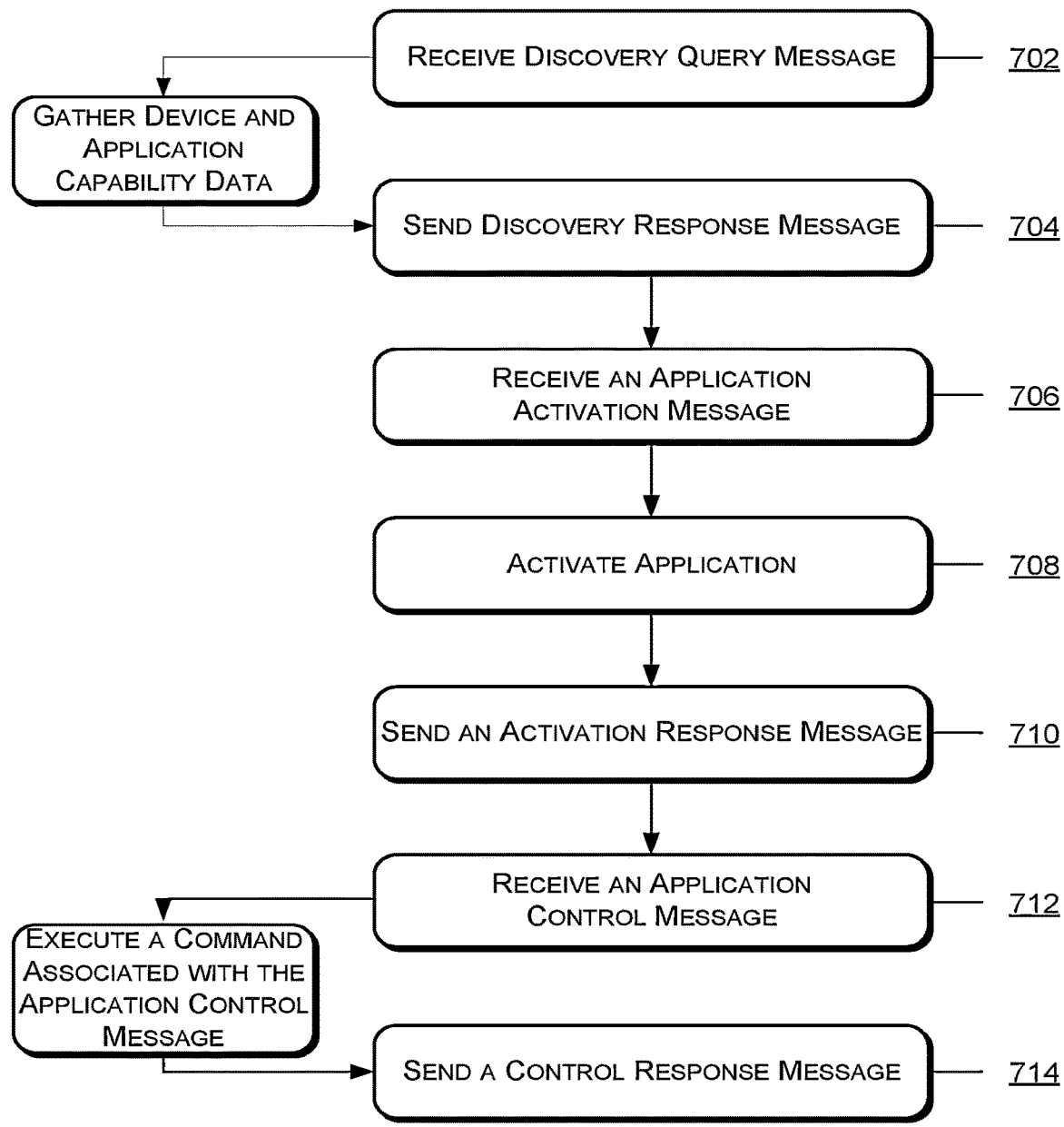
FIG. 7 is a flow diagram that illustrates a process flow of application discovery, activation and control from a target device using a cross device application discovery and activation system.

FIGS. 6, and 7 are flow diagrams depicting example processes for a cross device application discovery and/or control system. The operations of the example process are illustrated in individual blocks and summarized with reference to those blocks. The processes are illustrated as logical flows of blocks, each block of which can represent one or more operations that can be implemented in hardware, software, or a combination thereof.

FIG. 6 illustrates a process flow of application discovery, activation, and control from a source device using a cross device application discovery and activation system. FIG. 6 illustrates a process flow in which there is one source device and one target device, although this is just an example, and there may be more than one source device and/or more than one target device.

At block 602, a remote device discovery module on a source device, such as device 102, 200, and/or 302 identifies remote devices via a network connection. Responsive to discovering remote devices, the remote device discovery module can request and receive remote device trust information, including a user profile, a group user profile, a user preference setting, or any other way to determine the trust of the remote device.

At block 604, the model remote control module on the source device, such as model remote control module 400 processes the remote device trust information, and determines if the remote device can be trusted. In some examples, a remote device sharing a user profile with the source device can be trusted. In some examples, a remote device sharing a group profile with the source device can be trusted. In some examples, the source device user preference can set the trust such that any discoverable remote device can be trusted.

At block 606 the model remote control module on the source device can send an application discovery query message to one or more trusted remote devices. The application discovery query can include a request for application capability data on the one or more trusted devices, including the ability of an application to perform a particular task, the speed of an application, and/or other application performance data. The application discovery query can further include a request for device capability data, such as device memory, speed, and/or display capability, for the one or more trusted devices.

At block 608, responsive to the application discovery query, the model remote control module on the source device receives a discovery response message. The discovery response message can include an indication of at least one application capable of performing the task on the one or more trusted remote devices, application capabilities for the at least one application, and/or device capabilities for the one or more trusted remote devices. In some examples, the one or more discovery response messages can include a notification that a remote device and/or application on a remote device is not capable of executing the task.

At block 610, the model remote control module on the source device can receive a plurality of discovery response messages. A remote application discovery client can process the plurality of discovery response messages, and send remote application files to a remote application file limiter, such as remote application file limiter 408. The remote application file can be associated with an application, and can include application capability data and device capability data for a particular remote device containing the application.

At block 612, an application on the source device, via the remote application file limiter, can select a remote application file for activation and/or control. In various examples, a user, via input on a user interface can select the remote application file for activation and/or control. In some examples, a combination of an application on the source device and a user input can select the remote application file for activation and/or control.

At block 614, responsive to the selection of the remote application file associated with an application, the model remote control module on the source device sends an application activation message to the remote device containing the application. In some examples the application activation message can be sent to one or more remote devices containing the application. The application activation message can include a direction for the particular remote device to activate the application and run the requested task from the application discovery query. In some examples, the model remote control module on the source device can send a background task activation message to the one or more remote devices.

At block 616, the model remote control module on the source device can receive an activation response message from the one or more remote devices. The activation response message can include a notification of a successful activation of the application on the one or more target devices. In some examples, the activation response message can include a notification of a successful activation of a background task on the one or more target devices. In various examples, the activation response message can include a notification of the successful presentation of the task on a display associated with the one or more target devices. In some examples, the activation response message can include streaming task context data, such that the task context data can be presented on a display on the source device.

At block 618, the model remote control module on the source device can send an application control message. In some examples, the model remote control module on the source device can send a background task control message. The control message can include an instruction to play, pause, resume, stop, refresh, cancel, and/or execute any other lifetime and/or background task management function of an application and/or background task.

At block 620, responsive to the application and/or background task control message, the source device receives a control response message. The control response message can include a notification of a successful control of the application. In some examples, the control response message can include a notification of a successful control of a background task. In some examples, the control response message can include updated streaming task context data, such that the task context data displayed on the source device reflects the application control.

FIG. 7 illustrates a process flow of application discovery, activation and control from a target device using a cross device application discovery and activation system. FIG. 7 illustrates a process flow in which there is one source device and one target device, although this is just an example, and there may be more than one source device and/or more than one target device.

At block 702, an application model discovery and control manager module on a target device, such as device 102, 200, and/or 304, receives an application discovery query from a source device. The application discovery query can include a request for application capability data on the one or more trusted devices, including the ability of an application to perform a task, the speed of an application, and/or other application performance data. The application discovery query can further include a request for device capability data, such as device memory, speed, and/or display capability, for the one or more trusted devices.

Responsive to receiving the application discovery query, the application model discovery and control manager module can search an application repository module on the target device for application capability data. In some examples, the application model discovery and control manager can extract the application capability data from the application repository module. In some examples, the application model discovery and control manager module can extract device capability data from a data store, such as data store 208.

At block 704 the application model discovery and control manager module on the target device sends a discovery response message to the source device. The discovery response message can include at least one application capable of performing the task on the target device, application capabilities for the at least one application, and/or device capabilities for the target devices. In some examples, the discovery response message can include a notification that the target device and/or one or more applications on a target device are not capable of executing the task.

At block 706, the application model discovery and control manager module on the target device receives an application activation message, based at least in part on the discovery response message. The application activation message can include an instruction for the target device to activate an application on the target device. In some examples, the application activation message can include an instruction for the target device to activate a background task on the target device.

At block 708, the application model discovery and control manager module on the target device activates the application. In some examples, the application model discovery and control manager module can activate a background task.

At block 710, the application model discovery and control manager module on the target device sends an activation response message to the source device. The activation response message can include a notification of a successful activation of the application on the target device. In some examples, the activation response message can include a notification of a successful activation of a background task on the target device. In various examples, the activation response message can include a notification of the successful presentation of the task on a display on the target device. In some examples, the activation response message can include streaming task context data, such that the task context data can be presented on a display on the source device.

At block 712, the application model discovery and control manager module on the target device receives an application control message. In some examples, the application model discovery and control manager module on the target device can receive a background task control message. The application and/or background task control message can include an instruction to play, pause, resume, stop, refresh, cancel, and/or execute any other lifetime and/or background task management function of an application and/or background task. Responsive to receiving the application and/or background task control message, the application model discovery and control manager module on the target device can execute the instruction to control the application and/or background task.

In block 714, the application model discovery and control manager module on the target device sends a control response message to the source device. The control response message can include a notification of a successful activation of the application on the target device. In some examples, the control response message can include a notification of a successful activation of a background task on the target device. In some examples, the control response message can include updated streaming task context data, such that the task context data displayed on the source device reflects the application control.

In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The process can also be practiced in a distributed computing environment where functions are performed by remote processing devices that are linked through a communication network. In a distributed computing environment, computer-executable instructions can be located in local and/or remote computer storage media, including memory storage devices.

In the context of hardware, some or all of the blocks can represent application specific integrated circuits (ASICs) or other physical components that perform the recited operations.

The order in which the operations are described is not intended to be construed as a limitation, and any number of the described operations can be executed in any order, combined in any order, subdivided into multiple sub-operations, and/or executed in parallel to implement the described process.

EXAMPLE CLAUSES

A: A system comprising: a processor; a memory; one or more applications stored in the memory and executed, at least in part, by the processor; and a cross device remote control module, stored in the memory, wherein the cross device remote control module is configured to discover remote applications on one or more target devices, and comprises: a cross device application model client configured to send and receive messages via a network; and a remote application discovery client configured to process remote application information, the remote application information including at least an application capability.

B: A system as paragraph A describes, wherein the cross device application model client is further configured to: connect to the one or more target devices via the network; determine a trust of the one or more target devices; send an application discovery query to the one or more target devices based at least in part on the trust; and receive one or more application discovery responses from the one or more target devices.

C: A system as paragraph B describes, wherein the one or more application discovery responses are comprised of: application information; wherein the application information is comprised of at least an application capability to accomplish a particular task; and device information, wherein the device information is comprised of at least a device capability to accomplish the particular task.

D: A system as paragraphs A-C describes, wherein the remote application discovery client is further configured to: receive one or more application discovery responses; determine one or more remote application files, the one or more remote application files associated with one or more applications capable of accomplishing the particular task; and send one or more remote application files to a limiter.

E: A system as paragraphs A-D describes, wherein the cross device model remote control is further configured to instruct the one or more target devices to activate an application.

F: A system as paragraphs A-E describes, wherein the cross device model remote control is further configured to control a remote application in a master and slave configuration.

G: A system as paragraphs A-F describes, wherein the cross device model remote control further comprises a limiter, the limiter configured to: receive one or more remote application files; and select a particular remote application file.

H: A system as paragraph G describes, wherein the selection of the remote application files is accomplished via a user input.

I: A system as paragraph G describes, wherein the selection of the remote application files is accomplished by an application based at least in part on a discovery query.

J: A system as any of paragraphs A-I describes, wherein the cross device application model client is configured to: receive a remote application file; send an activation message to the one or more target devices, wherein the activation message instructs the target device to activate an application on the one or more target devices; and receive an activation response message from the one or more target devices, wherein the activation response message is comprised at least of: a notification of a task running on the application, and task context data for presentation on a display.

K: A system as any of paragraphs A-J describes, wherein the cross device application model client is configured to: receive a remote application file from the limiter; send an activation message to a target device, wherein the activation message instructs the target device to activate an application on the target device; and receive an activation response message from the one or more target devices, wherein the activation response message is comprised of: a notification of a task running on the application, and a notification of a task context data being presented on a display of the target device.

L: A computer-readable medium having thereon computer-executable instructions that responsive to execution configure a computer to perform a system as any one of paragraphs A-K describes.

M: A device or method comprising: a processor; and a computer-readable medium coupled to the processor, the computer-readable medium including instructions to configure one or more devices to perform a method as any of paragraphs A-K describes.

N: A device or method comprising: means for processing; and means for storing coupled to the means for processing, the means for storing, storing instructions to configure one or more devices to perform a method as any of paragraphs A-K describes.

O: A method comprising: receiving an application discovery query from a source device, the application discovery query requesting information associated with a capability to execute a task; determining a trust of the source device; determining whether a target device is capable of executing the task; determining whether the target device has an application capable of executing the task; and sending a discovery response message to the source device, the discovery response message being based on a result associated with the determining whether the target device is capable of executing the task and the determining whether the target device has an application capable of executing the task, and the discovery response message comprising at least a device capability and an application capability.

P: A method as paragraph O describes, further comprising: receiving an application activation message; and responsive to receiving the application activation message, activating an application on the target device.

Q: A method as paragraph P describes, further comprising: running a task of the application on the device, wherein the task has associated task context data; and sending an application response message to the source device, wherein the application response message is comprised at least of: a notification of the task associated with the application running on the device; and the task context data for presentation by the source device.

R: A method as paragraph P describes, further comprising: running a task of the application on the device, wherein the task has associated task context data; and sending an application response message to the source device, wherein the application response message is comprised at least of: a notification of the task associated with the application running on the device; and the task context data being presented by the target device.

S: A method as any of paragraphs O-Q describes, further comprising: receiving a background task activation message from the source device; responsive to the receiving the background task activation message, activating a background task on the device; and sending a background task response message to the source device.

T: A computer-readable medium having thereon computer-executable instructions that responsive to execution configure a computer to perform a method as any one of paragraphs O-S describes.

U: A device or system comprising: a processor; and a computer-readable medium coupled to the processor, the computer-readable medium including instructions to configure one or more devices to perform a method as any of paragraphs O-S describes.

V: A device or system comprising: means for processing; and means for storing coupled to the means for processing, the means for storing, storing instructions to configure one or more devices to perform a method as any of paragraphs O-S describes.

W: A computer readable medium having thereon computer-executable instructions, the computer-executable instructions responsive to execution configuring a device to perform operations comprising: identifying one or more remote devices; determining a trust of each of the one or more remote devices; sending an application discovery query to at least one of the one or more remote devices based at least in part on the trust of each of the one or more remote devices; receiving an application discovery response message from at least one of the one or more remote devices, the application discovery response message comprising information indicating: a device capability; and an application capability.

X: A computer-readable medium as paragraph W describes, wherein the device capability comprises at least one of: a remote device memory, a remote device speed, or a remote device presentation capability.

Y: A computer-readable medium as either paragraph W or X describes, the operations further comprising: selecting a particular remote device from the one or more remote devices, the selecting a particular remote device being based at least in part on the discovery response message; sending an application activation message to the particular remote device, the application activation message directing the particular remote device to activate an application; receiving an application activation response message, the activation response message being comprised of a notification of the application having been activated on the particular remote device; and controlling the application on the particular remote device from the device.

Z: A computer-readable medium as paragraph Y describes, the operations further comprising: receiving task context data from the particular remote device; and presenting the task context data via the device.

AA: A device or system comprising: a processor; and a computer-readable medium as any of paragraphs W-Z describes coupled to the processor.

AB: A device or system comprising: means for processing; and means for storing coupled to the means for processing, the means for storing, storing instructions to configure one or more devices to perform a method as any of paragraphs W-Z describes.

AC: A device comprising: a remote device discovery module, the remote device discovery module configured to discover one or more remote devices; a cross device remote control module, the cross device remote control module configured to determine a trust of the one or more remote devices.

AD: A device as paragraph AC describes, wherein the trust is based on at least one of: a user profile, a group profile, or a user preference.

AE: A device as either paragraph AC or AD describes, wherein the cross device remote control module is comprised of at least a remote application discovery client, the remote application discovery client configured to discover one or more applications on the one or more remote devices.

AF: A device as any of paragraphs AC-AE describes, wherein the cross device remote control module is further configured to: send an activation message to a target device, wherein the activation message instructs the target device to activate an application on the target device; receive an activation response message from the target device, the activation response message including at least a notification of a task running on the application; send an application control message, wherein the application control message instructs the target device to control the application on the target device; and receive a control response message, the control response message including at least a notification of a task being controlled on the application.

AG: A device as paragraph AF describes, wherein the application control message is comprised of an instruction indicating: a pause, a stop, a resume, a rewind, or a fast-forward.

AH: A device comprising: a remote device discovery module, the remote device discovery module configured to communicate with one or more devices; one or more applications; a cross device application discovery and control manager module, the cross device application discovery and control manager module configured to: receive a discovery query, the discovery query including at least a request for information associated with a capability to execute a task; determine whether the one or more applications is capable of executing the task; send a discovery response message, the discovery response message being based on a result associated with the determining whether the one or more applications is capable of executing the task.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A computer-implemented method for application discovery, the method comprising:
   receiving, at a target device, an application discovery query from a source device;
   determining, on the target device, that a level of trust between the target device and the source device is above a threshold trust level;
   determining, on the target device, based on a device capability of the target device, that the target device is capable of executing a task;
   determining, on the target device, based on an application capability of the target device, that the target device has an application capable of executing the task; and
   sending, from the target device, in response to the receiving of the application discovery query, a discovery response message to the source device, the discovery response message being based on determining that the target device is capable of executing the task and has an application capable of executing the task.

2. The method of claim 1, further comprising:
   receiving, at the target device, an application activation message; and
   responsive to receiving the application activation message, activating the application on the target device.

3. The method of claim 2, further comprising:
   running, on the target device, a task of the application, wherein the task has associated task context data; and
   sending, from the target device, an application response message to the source device, wherein the application response message comprises at least one of:
   a notification of the task associated with the application running on the target device; and
   the task context data for presentation by the source device.

4. The method of claim 2, further comprising:
   running, on the target device, a task of the application, wherein the task has associated task context data; and
   sending, from the target device, an application response message to the source device, wherein the application response message is comprised at least of:
   a notification of the task running on the application on the target device; and
   a notification of the task context data being presented by the target device.

5. The method of claim 1, further comprising:
   receiving, at the target device, a background task activation message from the source device;
   responsive to the receiving the background task activation message, activating a background task on the target device; and
   sending, from the target device, a background task response message to the source device.

6. The method of claim 1, wherein the application capability indicates performance data of the application.

7. The method of claim 1, wherein the device capability indicates at least one of device memory capability, device speed capability, and device display capability.

8. A target device for application discovery, the target device comprising:
at least one processor; and
memory storing instructions that, when executed by the at least one processor, cause the target device to perform operations comprising:
receiving an application discovery query from a source device;
determining that a level of trust between the target device and the source device is above a threshold trust level;
determining based on a device capability of the target device, that the target device is capable of executing a task;
determining based on an application capability of the target device, that the target device has an application capable of executing the task; and
in response to the receiving of the application discovery query, sending a discovery response message to the source device, the discovery response message being based on determining that the target device is capable of executing the task and has an application capable of executing the task.

9. The target device of claim 8, wherein the operations further comprise:
receiving an application activation message; and
responsive to receiving the application activation message, activating the application on the target device.

10. The target device of claim 9, wherein the operations further comprise:
running a task of the application, wherein the task has associated task context data; and
sending an application response message to the source device, wherein the application response message comprises at least one of:
a notification of the task associated with the application running on the target device; and
the task context data for presentation by the source device.

11. The target device of claim 9, wherein the operations further comprise:
running a task of the application, wherein the task has associated task context data; and
sending an application response message to the source device, wherein the application response message is comprised at least of:
a notification of the task running on the application on the target device; and
a notification of the task context data being presented by the target device.

12. The target device of claim 8, wherein the operations further comprise:
receiving a background task activation message from the source device;
responsive to the receiving the background task activation message, activating a background task on the target device; and
sending, from the target device, a background task response message to the source device.

13. The target device of claim 8, wherein the application capability indicates performance data of the application.

14. The target device of claim 8, wherein the device capability indicates at least one of device memory capability, device speed capability, and device display capability.

15. A source device comprising:
at least one processor; and
memory storing instructions that, when executed by the at least one processor, cause the source device to perform operations comprising:
determining that a level of trust between the source device and a target device is above a threshold trust level;
sending an application discovery query to the target device;
receiving an application discovery response message from of the target device, the application discovery response message comprising:
a device capability of the target device; and
an application capability of an application on the target device; and
processing the application discovery response message to determine a capability of the target device to perform a task.

16. The source device of claim 15, wherein the device capability comprises at least one of a target device memory; a target device speed; or a target device presentation capability.

17. The source device of claim 15, wherein operations further comprise:
selecting the target device from a plurality of target devices based on the application discovery response message;
sending an application activation message to the target device to direct the target device to activate an application;
receiving an application activation response message comprising a notification of the application having been activated on the target device; and
controlling the application on the target device from the source device.

18. The source device of claim 17, wherein the operations further comprise:
receiving task context data from the target device; and
causing the target device to present the task context data.

19. The source device of claim 15, wherein the operations further comprise:
sending a remote application file associated with the application discovery response message to a remote application file limiter, each of the one or more remote application files being associated with a respective application and specifying the application capability and the device capability.

20. The source device of claim 15, wherein the operations further comprise:
selecting, via a remote application file limiter, a remote application file of one or more remote application files that are available from the remote application file limiter, the selecting being for at least one of activation or control; and
selecting a remote target device, of the one or more remote target devices, based at least in part on the selected remote application file.

* * * * *